United States Patent
Rodkey et al.

(10) Patent No.: US 7,174,005 B1
(45) Date of Patent: *Feb. 6, 2007

(54) SCHOOL-WIDE NOTIFICATION AND RESPONSE SYSTEM

(75) Inventors: Ryan Scott Rodkey, Sugarland, TX (US); John Frank Rodkey, Jr., Sugarland, TX (US); David Lynn Hickey, Rosharon, TX (US); Darren Lynn Ross, Houston, TX (US)

(73) Assignee: Techradium, Inc., Sugar Land, TX (US)

( * ) Notice: Subject to any disclaimer, the term of this patent is extended or adjusted under 35 U.S.C. 154(b) by 48 days.

This patent is subject to a terminal disclaimer.

(21) Appl. No.: 11/132,542

(22) Filed: May 19, 2005

Related U.S. Application Data

(63) Continuation-in-part of application No. 11/117,594, filed on Apr. 28, 2005, now Pat. No. 7,130,389.

(51) Int. Cl.
*H04M 1/64* (2006.01)
*H04M 3/06* (2006.01)
*H04M 3/432* (2006.01)

(52) U.S. Cl. .............................. 379/88.12; 379/88.23; 379/252; 455/414.2

(58) Field of Classification Search ............ 379/88.12, 379/79, 88.19, 201.01
See application file for complete search history.

(56) References Cited

U.S. PATENT DOCUMENTS

| | | | |
|---|---|---|---|
| 6,463,462 B1 | 10/2002 | Smith et al. | 709/206 |
| 6,496,568 B1 * | 12/2002 | Nelson | 379/88.12 |
| 6,697,477 B2 * | 2/2004 | Fleischer et al. | 379/211.02 |
| 6,871,214 B2 | 3/2005 | Parsons et al. | 709/206 |
| 6,912,691 B1 * | 6/2005 | Dodrill et al. | 715/513 |
| 6,931,415 B2 * | 8/2005 | Nagahara | 707/102 |
| 2002/0032020 A1 * | 3/2002 | Brown et al. | 455/414 |

* cited by examiner

*Primary Examiner*—Gerald Gauthier
(74) *Attorney, Agent, or Firm*—Buskop Law Group, P.C.; Wendy Buskop

(57) ABSTRACT

A school-wide notification and response system utilizes an administrator interface to transmit a message from an administrator to a contact devices for employees and parents associated with a school. The system comprises a dynamic information database that includes parent and employee contact data, priority information, and response data. The administrator initiates distribution of the message based upon grouping information, priority information, and the priority order. The message is transmitted through at least two industry standard gateways simultaneously to groups of parent and employee contact devices based upon priority information. Once the message is received by the parent and employee contact devices, the parent and employee contact devices transmit a response through the industry standard gateways back to the dynamic information database.

19 Claims, 2 Drawing Sheets

US 7,174,005 B1

SCHOOL-WIDE NOTIFICATION AND RESPONSE SYSTEM

CROSS REFERENCE TO RELATED APPLICATIONS

The present application is a Continuation-in-Part to U.S. patent application Ser. No. 11/117,594, filed on Apr. 28, 2005, now U.S. Pat. No. 7,130,389 entitled "DIGITAL NOTIFICATION AND RESPONSE SYSTEM."

FIELD

The present embodiments relate generally to the creation and delivery of messages, to the routing, and to the verification and collection of responses to the messages to parents and employees associated with a school or a school system. The system and methods are universally applicable to, and independent of, the type of messaging system and device selected by the message recipients.

More particularly, the present embodiments relate to an immediate response information or emergency system for parents and employees associated with a school or a school system.

BACKGROUND

Schools and their parent and employees need a system to send and receive information using a variety of messaging formats, systems, and message receiving devices. For example, a school that is closed due to flooding needs to contact the parents and employees quickly. Often the messages will vary in their level of importance. This could affect the delivery methods and/or the nature and timing of any needed response to the message. For example, the arrival of an e-mail message from a particular sender might cause the recipient to fax a report in response. A message reporting a failure in a mission-critical computer system may need an immediate response from a maintenance technician that the message has been received and will be acted on. A message reporting a fire or other disaster may need to be sent simultaneously, or in a notification hierarchy, to multiple members of a disaster response team, with escalating methods of messaging and response gathering to insure that every team member has been notified and has responded in an appropriate fashion. In some group messaging contexts, the post-message processing, organizing, and reporting of multiple message responses can be important in further decision making by the message originator.

The prior art methods implemented in commercially available unified messaging and device specific systems generally provide one-way delivery, with destinations defined by the sender. Unfortunately, prior art systems do not solve the need for originating a message, with attachment and response requirements, in a manner and format that is independent of the type of the device that is to be used for delivering the message to the recipients. Also, prior art systems do not permit the message notification methods to be defined by the recipients, and do not include a facility for automatic processing and organization of message responses. Accordingly, known e-mail, unified messaging and specific device systems using these prior art methods are deficient in responding to these requirements.

A need exists for a system and method for automating and escalating the delivery of messages and collection of message responses implemented through messaging devices of multiple types. The system needs to work in conjunction with recipient rules routing, verification of notification and response, and collection of responses in a predefined format.

A need exists for a digital information and response system to bridge the gap between the government and the public for communication without being limited to one device.

A need exists for a method of communication from an administrator which reaches all possible forms of communication devices, so that all members of the public can be reached.

A need exists for a system that can transmit a message in multiple languages to multiple user devices to inform the public of emergency situations, and general information simultaneously.

The present embodiments meet these needs.

BRIEF DESCRIPTION OF THE DRAWINGS

The detailed description will be better understood in conjunction with the accompanying drawings as follows.

Figure 1:
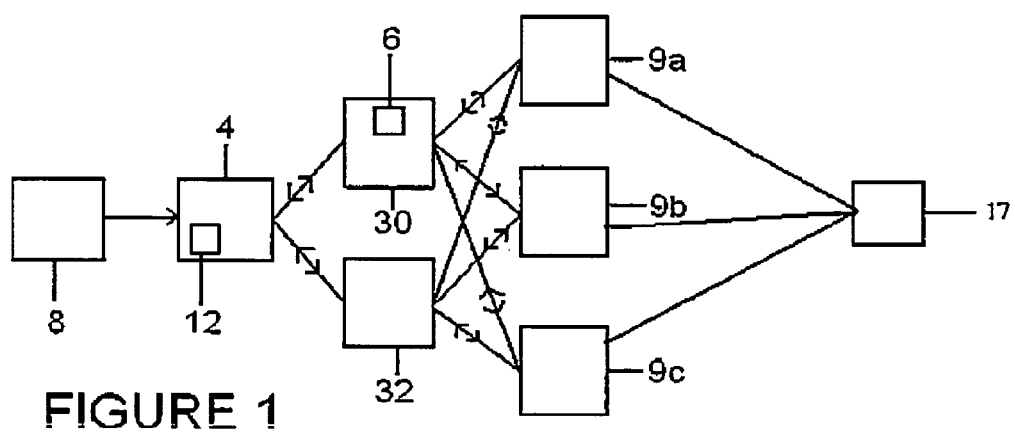
FIG. 1 depicts a representation of an embodiment of a digital notification and response system.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that the invention can be practiced or carried out in various ways.

The present embodiments relate to an immediate response information or emergency system for a school or school system. The embodied methods provide better communication with parents other than using conventional telephone.

The embodied methods provide an emergency communication system that ensures both parents and employees of a school are contacted simultaneously to a chosen first user device, such as an email, or a cellular phone, or a Blackburry™.

The present embodiments relate to system that can be used for both emergency use and for improved communication between parents and students. For example, the system can be used to notify a parent when a child is missing from school. The systems can be used to advise parents of PTA meetings, sports events, early dismissals which a student might be reluctant to tell his or her parents. The system provides as a benefit in that parents can be notified that report cards are being sent home. Parents can be notified when special homework assignments, such as book reports, are due.

The embodied methods and systems can be used to provide information updates to parents on power outages, snow days, flood days, and other school closures, such as from leaking roofs, or a smoking furnace. Mundane information, such as a need for a school physical prior to the start of school, information on overdue library books, and information regarding a students poor eating habits at school, can also be transmitted easily to parents.

The embodied methods can be used to contact school board members concerning school board meetings, changes in curriculum, and information related to safety in the schools information. This present embodiments are designed to save lives, prevent vandalism, and keep neighborhoods near the schools free of drug problems and other harmful situations.

The system can simultaneously advise parents, police, and employees about a drug abuse situation. The system can be adapted to provide a tip line for students. For example, the tip line can be a call in feature for students to let high school or other school officials notify someone when a crime or drug abuse situation is witnessed. The tip line can be useful in reducing crime and providing a safe environment in the school.

The embodied methods provide a manner for the information to be transmitted to parents and employees in "real time" or nearly immediately. The system is designed to be operational throughout the school year. The system can maintain a current database of contact information for parents and employees In the context of the present application, the term "parents" refers to biological parents, foster parents, guardians, uncles and aunts designated as caretakers for children, grandparents designated as caretakers, or others which are recognized as the caretakers of the student in the school to which this system applies.

With the scope of this application, the term "employee" refers to teachers, other faculty, janitors, coaches, contractors to the school, principals, secretaries, superintendents, consultants to the schools, school board members, coordinators, security personnel, counselors, maintenance personnel for the school, and other individuals that work on the facility, in the facility, or in conjunction with school activities.

The present embodiments relate to the creation and delivery of messages, and to the routing, and to the verification and collection of responses to the messages to parents and employees of a school or a school system. The system and methods are universally applicable to, and independent of, the type of messaging system and device selected by the message recipients. The present embodiment relates to the simultaneous transmission of a message in multiple languages to a user device, wherein the recipient of the message selects the language for transmission to the recipient.

The embodied immediate response information systems provide a timely and uniform manner to contact numerous users through numerous user contact devices, such as a cell phone, a television, a LED display, a land phone line, an e-mail address, a fax machine, a pager, a digital display, similar devices, and handheld wireless device, including PDAs and a Blackburry™.

The system is used to contact parents and employees in the case of emergency conditions, such as storms or fire; and in the case of informational situations, such as school closings.

The present embodiments provide a system that has a high speed notification and response system in which information is accessed and stored in a dynamic information database. The systems can be set to contact parents and employees automatically when specific conditions arise or to contact parents and employees when initiated by an administrator. The systems can be set to contact a large number of parents and employees in a systematic manner based upon priority.

The present embodiments can be used to save lives because the system can notify large groups of individuals concerning very dangerous situations quickly to many different devices. The system can be used to stop rumors that a situation is safe. This system stops panic and chaos, because the system can send a consistent message to all parents and employees on the system.

The embodied immediate response information systems provide other benefits, such as general information update, which are not emergency situations. For example, a message can be sent such as "bring a flower to your teacher tomorrow because it is her birthday" to all parents of parents of students in a second grade teacher using the system.

As an example, an embodiment of the system can be utilized as follows: A principal of a high school, in this example the administrator, wants to send the following message to all parents of students and employees associated with the school. "A chemical leak has occurred at a nearby chemical plant, and we want all children to stay inside today". The principal goes to his computer, goes to the web browser, and clicks on the site that contains the administrator interface, such as "irisdispatch.com". The site is the administrator interface used to transmit the message to the parents and employees via a contact device. Once the web interface comes up, the principal enters the site using with a user name and a password, such as Jerry Spears, password: 123jsp. The principal types in the message, "A chemical leak has occurred at a nearby chemical plant. We are canceling school and urge all children, parents, and employees of Dobie High School to stay indoors. All outside activities are cancelled." Once the message is entered, the principal presses the send button. The system proceeds automatically to do the following:

a. The system identifies that the employees of Dobie High School are the first priority group for this type of message. The system transmits the message to each employee's contact device based upon the contact information in the database.

b. The system identifies that the parents of Dobie High School students are the second priority group for this type of message. Likewise, system transmits the message to each parent's contact device based upon the contact information in the database.

c. The system continues to contact groups based upon priority groupings for this type of message.

d. Each contact device returns a response that the information has been received. The database stores the information into a database for report generation on demand.

e. The system continues to transmit the message to contact devices that have not responded until all contact devices have received the message or until the principal ends the transmission.

As a second example, an embodiment of the system can be utilized as follows: At a high school, a student appears in classroom with a handgun and seems to be threatening other students. A teacher sees the behavior and runs to the administrator interface console in the school. In this example, the administrator interface console is a dedicated computer with an icon that allows for quick access to the administrator interface. The teacher accesses the interface with a user name and password, and selects a predefined message from the initial page of the web interface. In this case, the teacher sends the following message: "Need Police Assistance at Clearwater High immediately" and, then, adds a custom message: "Room 22." The message is transmitted to priority groups based upon priority order. In this case, the police department receives the message first since the police are recognized by the system as the first priority group for this type of message. The system then proceeds like the first example in contacting all devices and collecting all responses.

With reference to the figures, FIG. 1 examples an embodiment of a digital notification and response system, wherein an administrator (8) can transmit one or more messages (6)

to one or more parents and employees contact devices (9a, 9b, and 9c) using an administrator interface (4). FIG. 1 represents a simplified embodiment, wherein two parent contact devices (9a and 9b) and notified and one employee contact device is notified (9c).

The administrator (8) can be a person, a computer, an analog emergency notification system, or another digital notification and response system or the like. The administrator (8) interacts with the administrator interface (4) to begin the process of sending a message to the parent and employee contact devices (9a, 9b, and 9c). The administrator interface (4) can be a local area network interface, a wide area network interface, a virtual private network interface, asynchronous transfer mode interface, synchronous optical network interface, a call center, a voice mail, or other similar means to transmit a message to numerous contacts.

The message can be a text message, a numerical message, one or more images or a combination of these. The message can be encoded. The message can include a designation that identifies the importance the message. Examples of these designations include low priority, general priority, significant priority, high priority, and severe priority. The designations can be color-coded, such as green for a low priority message, blue for a preparedness message or general priority message, yellow for a cautionary message such as a significant priority, orange for an emergency message or high priority message, or red for a critical message with a severe priority. These priority levels can be customized and tailored to standards for a particular school or school system.

As seen in FIG. 1, the message (6) is transmitted to one or more parent and employees contact device (9a, 9b, and 9c). Examples of usable contact devices include handheld wireless devices, wireless phones, land phones, e-mail addresses, digital displays, and LED display, fax machines, pagers, and similar devices that capable of receiving a message. An example of a handheld device includes a PDA, a blackberry, or cellular phone.

The message (6) is stored on a dynamic information database (12). The message can be a prewritten message stored in the database for subsequent use by the administrator or can be generated from the dynamic information database (12) based upon inputs from the administrator and transmitted using the administrator interface.

Figure 2:
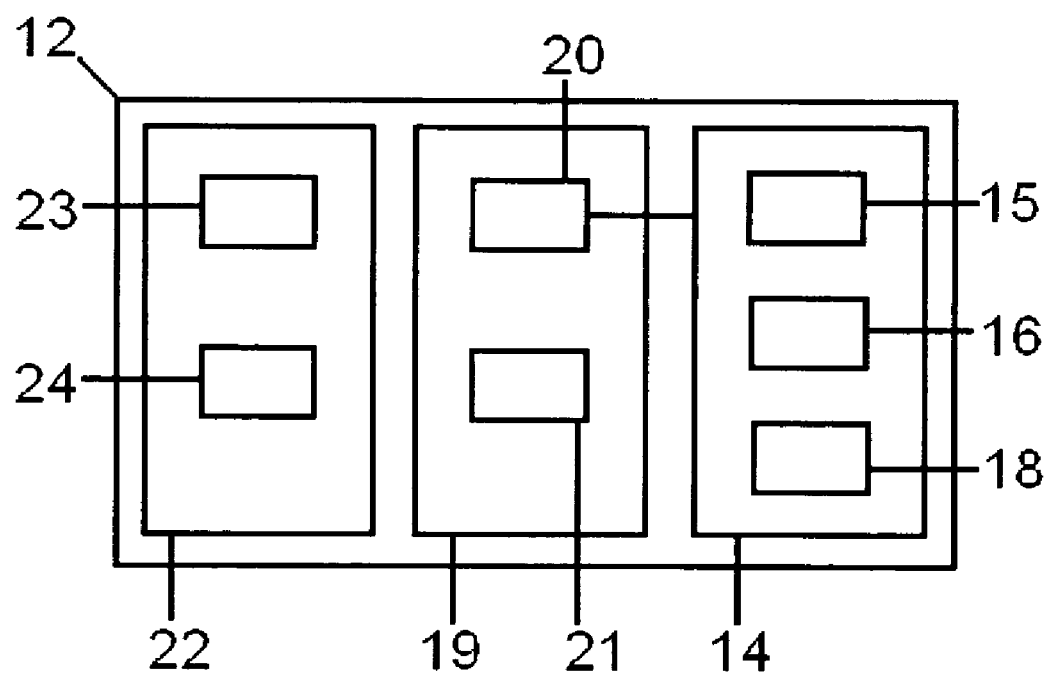
FIG. 2 depicts a representation of an embodiment of a dynamic information database associated with a digital notification and response system.

FIG. 2 shows a schematic of the dynamic information database (12). The dynamic information database (12) includes three sections: contact data (14), grouping information (19), and response data (22). Contact data (14) includes data for both parents and employees. The dynamic information database (12) can be an SQL™ database, MySQL™ database or other industry standard databases, an Oracle™ database, or other similar database that can organize information in a similar manner. The contact data (14) in the dynamic information database (12) includes parent and/or employee contact information (15), priority information (16), and user selected language for the message (18). The contact data (14) includes information related with the parent and/or employee associated of the user contact device. The user, within the scope of this application, is a person that can receive a message, send a message, respond to a message, or combinations thereof. Examples of users include a school or school system, an individual, a parent of a child, a security company, combinations, or the like.

The contact information (15) includes information concerning both the contact device and the parents and/or employees. The contact information (15) can include an e-mail address, an internet protocol (IP) address, a phone number, and combinations thereof. The contact information (15) can further include a name, an address, a phone number, a device address, a social security number, an account code, and combinations thereof. Each contact device can include information that is unique to each individual parent and/or employee contact device or can include information that is common to all contact devices. For example, a serial number for a cell phone, a mac address for an Ethernet card and so on.

The contact data (14) further includes priority information (16). The priority information (16) is used to indicate a contact order for various contact devices of the parents and employees. The contact order is used to direct the order in which the dynamic information database (DID) transmits a message to the contact devices (9a, 9b, and 9c).

The contact data (14) can include information beyond the examples listed in order to aid the DID in contacting the user contact devices.

Continuing with FIG. 2, the grouping information (19) in the dynamic information database (12) is used to group the parents and employees together into separable and identifiable groups for ease of contact by an administrator. The grouping information (19) can include one or more groups (20) associated with the contact data (14). By grouping the parents and employees, the system provides the benefit of more efficient delivery of information without having to treat each user individually. Grouping more efficiently defined message recipients speeds the delivery of the message.

The grouping information can include a predefined group identified in the dynamic information database. The predefined group can be identified by the administrator or by another user in advance to sending the message. Examples of groupings include parents of a second grade class, an alumni class from a specific year, hazmat response teams, janitors, superintendents, school board members, teachers, and other similar groupings.

The grouping information (19) further includes a priority order for contacting each parent and employee within the group (20). The priority order directs the administrator interface (4) as to the order in which the interface should contact the individual contact devices with the message. The priority order provides the benefit of ensuring that the most critical parents and employees receive the message first in case time is not available to contact all of the users. The priority order also provides the benefit that all parents and employees get contacted with equal priority, rather than a discriminating message delivery priority. The priority order guarantees that all users get contacted to on a preferred device first.

The response data (22) in the dynamic information database (12) is directed towards information based upon whether the contact device and, in turn, the parent and/or employee, received the message. The response data (22) includes response information (23) that indicates whether the parent and/or employee (17) has received the message (6). The response information (23) is gathered by the dynamic information database (12). The response data (22) further includes "error-in-response" information (24) that indicates the contact data (14) is insufficient and can not be delivered properly. The error in response information (24) can also indicate that an e-mail address or phone number is simply invalid.

Returning to FIG. 1, the administrator (8) can initiate a distribution of one or more messages (6). The system can be initiated automatically. Fire alarms when set off, can automatically alert the system, and then the system can automatically advise a user. Another example is that the system can tie to a tracking system, so that if a child misses certain periods of school, the system can advise the parent that the student is missing those classes.

The system uses the information in the dynamic information database (12) namely the grouping information (19), priority information (16), and the priority order (21), to determine who to contact and in what order.

The message (6) is transmitted through at least two industry standard gateways (30 and 32) simultaneously. By transmitting the message (6) through numerous gateways, the system provides redundancy in order to ensure the message is relayed to the parents and employees. An example of an industry standard gateway is a SMTP gateway, a SIP, an H.323, an ISDN gateway, a PSTN gateway, a softswitch, or the like.

The priority order directs the administrator interface (4) to contact a first group of contact devices (9a) indicated as a first contact. After all of the contact devices in the first contact have received the message, the priority order directs the administrator interface (4) to contact a second group of contact devices (9b) indicated as a second contact. Then, the administrator interface continues to relay messages to contact devices based on the priority order until all contact devices are reached and a response is provided from the contact devices.

Once the message is received by a contact device, the contact device (9a, 9b, and 9c) transmits a response back through the industry standard gateways (30 and 32) to the dynamic information database (12). The dynamic information database (12) stores the responses and the unique address of each user contact device.

In an alternative embodiment, the system can include reporting information in order to generate reports based upon information in the dynamic information database (12). The reports can be generated by the administrator, the user, a group, or combinations thereof. The reports can include a date the message was sent, a time the message was sent, a date the message was received, a time the message was received, content of the message, a recipient of the message, recipient information related to the recipient of the message, and combinations thereof. Other examples include the name of the person who received the message, a copy of the voice mail, a time when an e-mail was accessed, the time when a fax is printed and so on. The administrator can create custom designed reports, or standard reports can be generated from the dynamic information database for use by the administrator.

In an alternative embodiment, the system can include a language converter to translate a text message to second language. The language converter is often referred to as a text translator. For example, the language converter can convert the message from English to a second language, such as Korean, Chinese, Vietnamese, French, English, Spanish, Italian, Norwegian, Swedish, German, Japanese, Russian, or Portuguese. The language converter is beneficial because not all users speak the same language, thereby causing a breakdown in the communication between groups of people due to language. The system allows the user to designate a specific language in which to receive the message. The chosen language is stored in the dynamic information database (12) with the user contact data (14).

In an alternative embodiment, the system can include a text-to-sound file converter. The text-to-sound file converter can be used to translate a message from text to a sound file. The text-to-sound file converter is beneficial because the message is consistent using the same voice, with the same accent, same dynamic, same delivery speed. The text-to-sound file converter enables individuals with disabilities, namely visual impairment, to also receive the consistent message.

The claimed notification and response system provides quick delivery speed. The system can send alert messages to thousands of recipients in about thirty seconds with the click of a single mouse. In the event of computer failure, the network can be contacted toll free from any phone to get the message directly from an administrator. Every second counts when a student is drowning in the school swimming pool or some other crisis is occurring. This notification system alerts people who need to respond right away.

The claimed notification and response system provides format and message flexibility. The emergency response system can reach numerous recipients on numerous types of contact devices virtually at the same time. For example, the system can contact telephones, cell phones, digital pagers, fax machines, wireless PDA devices, email systems, computer system tray icons, Amber alert systems, and LED signs. Voice and text can be delivered in numerous languages as specified by recipients. The system can enable parents of students who do not speak English well to be notified and act on an emergency message enabling immigrant families to act quickly as well as native English speaking families. Since the claimed system solves the language barrier problems, the system is vital to states that have large non-English speaking family populations, such as Texas, California, and Florida.

The embodied emergency system provides message consistency. The notification system can be used to deliver exactly the same message to all recipients to prevent confusion and rumor control. Message inconsistency can cause people to go to the wrong location or follow conflicting directions in the case of a bomb threat, terrorist action, or other act of extreme violence.

The system can be used to prevent bombing and bomb threats. For example, the locker bomb explosion in January 1999 in a high school in Kansas City sent eleven students to the hospital. If a silent alarm or alert system had been triggered to all the teachers when the bomb threat was known, a quick evacuation of the school could have occurred in order to prevent the injuries or deaths.

In another example, a Maryland School district experienced more than one hundred and fifty bomb threats with fifty-five associated arrests in a single school term of nine months. If the claimed notification system was in place, the cost of notifying the parents and teachers and employees of the school system would have been less than the cost incurred in notifying students, parents, and authorities. The messages could have been delivered quickly and simultaneously to aid in evacuating schools or warning students from coming to school. The quick messages could also have led to quicker arrests since more people were aware of the problem. The system would have also provided a consistent message in order to quell rumors.

The claimed notification and response system provides receipt verification. The notification and response system automatically verifies message receipt and saves data for a variety of reports. Receipt verification of an emergency situation helps saves lives by providing accountability to the schools. Schools can show that the required parities were sent the needed message and that the message was received by those individuals.

The embodied emergency system provides a system that provides significant cost savings to schools and school systems. The systems use devices that users, parents, teachers, and workers already have in order to transmit and receive messages. The system does not require additional hardware. Since the system is more cost effective, more schools and school systems can afford the notification system. Schools in the poorest school districts in the country with massive drug abuse and drinking problems can afford to use this system to stop harm and save lives.

The claimed notification and response system are reliable. The systems provides digital, broadband, fail-safe, multi-format rapid verification and response communication connected to the world's most reliable internet communications network. This reliability saves lives because police, fire, security, and medical professionals can be notified at any time upon indications of an alarm. Reliable messages lead to fast response and saved lives.

The embodiments have been described in detail with particular reference to certain embodiments, thereof, but it will be understood that variations and modifications can be effected within the scope of the embodiments, especially to those skilled in the art.

What is claimed is:

1. A school-wide emergency digital notification and response system, comprising:
   a. an administrator interface for preparing and transmitting a message from an administrator to at least one parent contact device and at least one employee contact device, wherein each parent contact device corresponds to a parents in a school, and wherein each a employee contact device corresponds to an employee of the school;
   b. a dynamic information database for storing the message remote to the school, wherein the dynamic information database comprises:
      i. parent data comprising:
         1. parent user contact device information; and
         2. parent priority information that indicates a contact order for the parent contact device;
      ii. employee data comprising:
         1. employee contact device information; and
         2. employee priority information that indicates a contact order for the employee contact device;
      iii. user selected grouping information comprising:
         1. at least a first group associated with each parent user contact device;
         2. at least a second group associated with each employee user contact device;
         3. a parent priority order for contacting each parent user contact device within the first group; and
         4. an employee priority order for contacting each employee user contact device within the second group;
      iv. response data comprising:
         1. parent response information indicates which parent contact devices have received the message;
         2. employee response information indicates which employee contact devices have received the message; and
         3. response information that indicates when insufficient contact device information exists to contact the parent contact device, the employee contact device, or combinations thereof;
   wherein the administrator initiates distribution of the message using the parent data, employee data, and grouping information, wherein the message is transmitted through at least two industry standard gateways simultaneously, and the message is received by at least one parent contact device and at least one employee contact device, and wherein the at least one parent contact device and at least one employee contact device transmits a response through the industry standard gateways to the dynamic information database.

2. The system of claim 1, wherein the parent data and the employee data further comprise a user selected language for translating the message to be transmitted.

3. The system of claim 2, further comprising a language converter for translating the message to be transmitted into the user selected language.

4. The system of claim 1, further comprising a text-to-sound file converter for translating the message from text to a sound file.

5. The system of claim 1, further comprising reporting information for generating custom designed reports created by the administrator, the at least first group, the at least second group or combinations thereof, standard reports generated from the dynamic information database, or combinations thereof.

6. The system of claim 5, wherein the reporting information comprises a date the message was sent, a time the message was sent, a date the message was received, a time the message was received, content of the message, a recipient of the message, recipient information for the message, and combinations thereof.

7. The system of claim 1, wherein the administrator interface is a local area network web interface, a wide area network web interface, virtual private network interface, asynchronous transfer mode interface, synchronous optical network interface a call center interface, a voice mail, or combinations thereof.

8. The system of claim 1, wherein the administrator is a person, a computer, another digital notification and response system, an analog emergency notification system, and combinations thereof.

9. The system of claim 1, wherein the message comprises a designation selected from the group consisting of low priority, general priority, significant priority, high priority, and severe priority.

10. The system of claim 9, wherein each designation is associated with a color.

11. The system of claim 1, wherein the message is a prewritten message stored in the dynamic information database for subsequent use by the administrator.

12. The system of claim 1, wherein the dynamic information database is an SQL™ database, MySQL™ database, other industry standard databases, an Oracle™ database, or combinations thereof.

13. The system of claim 1, wherein the grouping information is a predefined group identified in the dynamic information database, wherein the predefined group is identified by the administrator prior to transmitting the message.

14. The system of claim 1, wherein the two industry standard gateways are selected from the group consisting of a SMTP gateway, a SIP, an H.323, an ISDN gateway, a PSTN gateway, a softswitch, and combinations thereof.

15. The system of claim 1, wherein an employee contact data and a parent contact data are a member selected from the group consisting or an user name, an user address, an user phone number, an user device address, a social security number, an account code, employee identification number, student identification number, and combinations thereof.

16. The system of claim 1, wherein the priority order of a user devices is selected by the user.

17. The system of claim 16, wherein the parent priority order directs transmission of the message first to all parent contact devices indicated as a first contact, then second to all parent contact devices indicated as a second contact, then continues contacting parent contact devices based on the priority order until all parent contact devices are contacted.

18. The system of claim 16, wherein the employee priority order directs transmission of the message first to all employee contact devices indicated as a first contact, then second to all employee contact devices indicated as a second contact, then continues contacting employee contact devices based on the priority order until all employee contact devices are contacted.

19. The system of claim 1, wherein the contact devices area handheld wireless device, a wireless phone, a land phone, an email address, a fax machine, a pager, a digital display, an LED display, or combinations thereof.

* * * * *